United States Patent
Sreekanth et al.

(10) Patent No.: US 10,871,075 B2
(45) Date of Patent: Dec. 22, 2020

(54) COOLING PASSAGES IN A TURBINE COMPONENT

(71) Applicant: PRATT & WHITNEY CANADA CORP., Longueuil (CA)

(72) Inventors: Sri Sreekanth, Mississauga (CA); Si-Man Lao, North York (CA); Michael Leslie Clyde Papple, Verdun (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 621 days.

(21) Appl. No.: 14/923,660

(22) Filed: Oct. 27, 2015

(65) Prior Publication Data
US 2017/0114646 A1 Apr. 27, 2017

(51) Int. Cl.
*F01D 5/18* (2006.01)
*F01D 9/06* (2006.01)

(52) U.S. Cl.
CPC .............. *F01D 5/186* (2013.01); *F01D 9/065* (2013.01)

(58) Field of Classification Search
CPC ........... F01D 5/186; F01D 5/181; F01D 5/18; F01D 5/182; F01D 5/187; F01D 5/188
USPC ....................................................... 416/97 R
See application file for complete search history.

(56) References Cited

U.S. PATENT DOCUMENTS

| | | | |
|---|---|---|---|
| 4,380,906 A | 4/1983 | Dierberger | |
| 4,622,821 A | 11/1986 | Madden | |
| 5,326,224 A * | 7/1994 | Lee | F01D 5/186 416/90 R |
| 6,190,120 B1 | 2/2001 | Thatcher et al. | |
| 6,254,334 B1 * | 7/2001 | LaFleur | F01D 5/186 415/115 |
| 6,254,347 B1 | 7/2001 | Shaw et al. | |
| 6,305,904 B1 | 10/2001 | Weigand et al. | |
| 6,359,254 B1 | 3/2002 | Brown | |
| 6,379,118 B2 * | 4/2002 | Lutum | F01D 5/186 416/97 R |
| 6,412,268 B1 | 7/2002 | Cromer et al. | |
| 6,573,474 B1 | 6/2003 | Loringer | |
| 6,705,831 B2 | 3/2004 | Draper | |
| 7,137,776 B2 | 11/2006 | Draper et al. | |
| 7,273,351 B2 * | 9/2007 | Kopmels | F01D 5/186 416/97 R |
| 7,351,036 B2 * | 4/2008 | Liang | F01D 5/186 416/97 R |
| 7,665,956 B2 * | 2/2010 | Mitchell | F01D 5/182 415/115 |
| 7,820,267 B2 | 10/2010 | Fahndrich | |
| 2001/0016162 A1 | 8/2001 | Lutum et al. | |
| 2002/0025248 A1 | 2/2002 | Lee et al. | |
| 2002/0094272 A1 | 7/2002 | Fleck | |
| 2003/0133795 A1 | 7/2003 | Manning et al. | |

(Continued)

*Primary Examiner* — Moshe Wilensky
*Assistant Examiner* — Jason Mikus
(74) *Attorney, Agent, or Firm* — Norton Rose Fulbright Canada LLP (57) ABSTRACT

A turbine component has a plurality of cooling passages each extending through a body of a structure between opposite hot and cold surfaces of the structure. According to one embodiment, at least one of the cooling passages includes a plurality of upstream paths defining respective inlet openings on the cold surface and merging into a number of downstream paths defining respective outlet openings on the hot surface.

20 Claims, 8 Drawing Sheets

(56) References Cited

U.S. PATENT DOCUMENTS

| | | |
|---|---|---|
| 2005/0175454 A1 | 8/2005 | Dube et al. |
| 2006/0042255 A1 | 3/2006 | Bunker et al. |
| 2006/0163211 A1 | 7/2006 | Pietraszkiewicz et al. |
| 2009/0304499 A1 | 12/2009 | Strock et al. |
| 2011/0236178 A1* | 9/2011 | Devore .................. B22C 9/04 415/1 |
| 2012/0117973 A1 | 5/2012 | Gerendas |
| 2012/0301319 A1 | 11/2012 | Lacy et al. |
| 2013/0205791 A1 | 8/2013 | Mongillo, Jr. et al. |
| 2013/0209229 A1* | 8/2013 | Xu ........................ F01D 9/041 415/115 |
| 2014/0116666 A1* | 5/2014 | Xu ........................ F01D 9/065 165/169 |
| 2014/0338347 A1 | 11/2014 | Gage et al. |
| 2015/0059357 A1 | 3/2015 | Morgan et al. |
| 2017/0030200 A1 | 2/2017 | Kruckels et al. |

* cited by examiner

COOLING PASSAGES IN A TURBINE COMPONENT

TECHNICAL FIELD

The application relates generally to gas turbine engines and, more particularly, to cooling passages in a turbine component for such engines.

BACKGROUND OF THE ART

Combustors of gas turbine engines are subject to high temperatures and effusion holes can be used to direct air to cool combustor components such as combustor liners, domes and heat shields. Effusion holes extend through the component at a shallow angle with respect to the surface of the component, for efficiently cooling without risking a reduction in combustion temperatures. A typical effusion hole is designed to be a straight cylindrical passage. The length of the hole is dictated by the thickness of the component such as a combustor liner and the angle of the effusion hole with respect to the combustor liner surface. In conventional effusion cooling, heat is removed from, for example the combustor liner, via three mechanisms: backside convection cooling, in-hole convection cooling, and film cooling. Due to the limited thickness of the combustor liner and thus the limited length of the cooling passage formed by the effusion hole, effusion cooling performance is traditionally more dependent on a film cooling mechanism than on the in-hole convection cooling. Nevertheless, it is desirable to sometimes make the overall hole cooling system less dependent on a film cooling mechanism, particularly in regions where the film tends to mix with the hot gas, rather than staying on the combustor liner surface.

Accordingly, improved effusion cooling holes for enhanced cooling performance are desirable.

SUMMARY

In one aspect, there is provided a turbine component, comprising: a structure having a hot surface for being exposed to hot combustion gases and a cold surface for being exposed to cooling air, the hot and cold surfaces being opposite each other; and a plurality of cooling passages extending through a body of the structure between the hot and cold surfaces, at least one of the cooling passages comprising: a plurality of upstream paths defining a plurality of inlet openings on the cold surface and merging into a downstream path that defines an outlet opening on the hot surface.

In another aspect, there is provided a turbine component comprising: a structure having a hot surface for being exposed to hot combustion gases and a cold surface for being exposed to cooling air, the hot and cold surfaces being opposite each other; a plurality of cooling passages extending through a body of the structure from the cold surface to the hot surface, at least one of the cooling passages comprising a plurality of upstream paths defining respective inlet openings on the cold surface and merging into a number of downstream paths defining respective outlet openings on the hot surface.

In a further aspect, there is provided a turbine component, a turbine component, comprising: a structure having a hot surface for being exposed to hot combustion gases and a cold surface for being exposed to cooling air, the hot and cold surfaces being opposite each other; and a plurality of cooling passages extending through a body of the structure between the hot and cold surfaces, each of the cooling passages comprising: a plurality of upstream paths defining respective inlet openings on the cold surface and extending from the respective inlet openings inwardly into the body; and a plurality of downstream paths connected with the upstream paths and extending toward the hot surface to define respective outlet openings on the hot surface, all of the upstream and downstream paths being connected together, each of the downstream paths including a metering section having a constant cross-section and a flared section defining one of said outlet openings.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
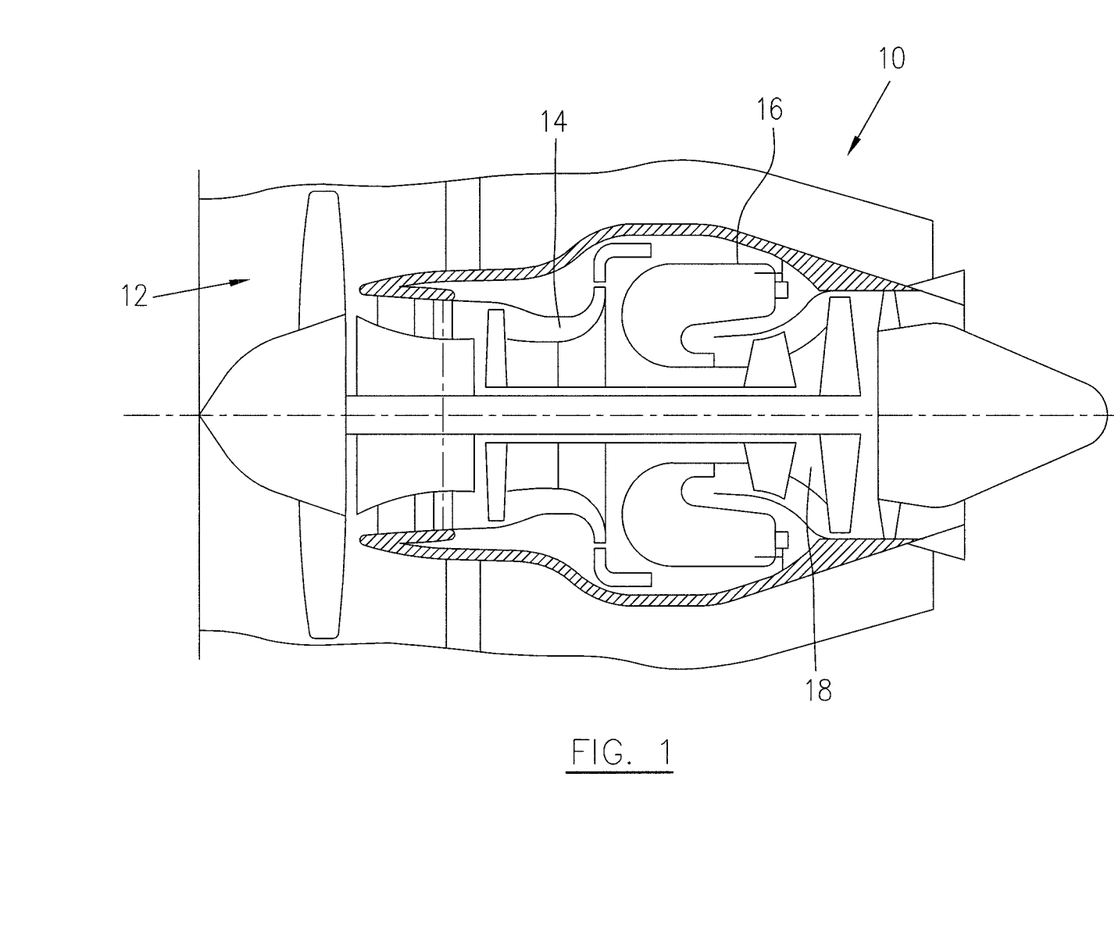
FIG. 1 is a schematic side cross-sectional view of a gas turbine engine as an example illustrating application of the described subject matter.

FIG. 1 illustrates a turbofan gas turbine engine 10 of a type provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases.

It should be noted that the terms "upstream" and "downstream" used herein and hereinafter refer to the direction of a fluid flow passing through a described passage.

As illustrated in FIGS. 3-4, 6-8, 10-11 and 14 a turbine component having a structure such as a combustor liner 20 which may be of a single skin type, may include a surface 22 and a surface 24 opposite each other. The surfaces 22, 24 may or may not be parallel to each other and may define a body 26 of the combustor liner 20 therebetween. The surface 24 may be exposed to cooling air and is referred to as a "cold" surface of the combustor 20 and the other surface 22 may be exposed to hot combustion gases generated within the combustor 16 and is referred to as a "hot" surface.

Figure 2:
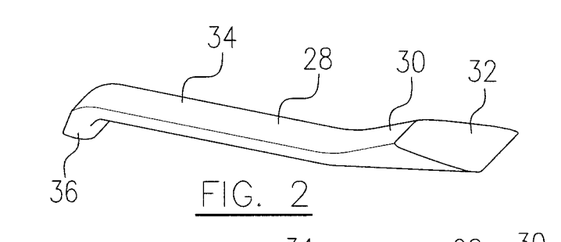
FIG. 2 is an isometric view of a cooling passage according to one embodiment.
Figure 3:
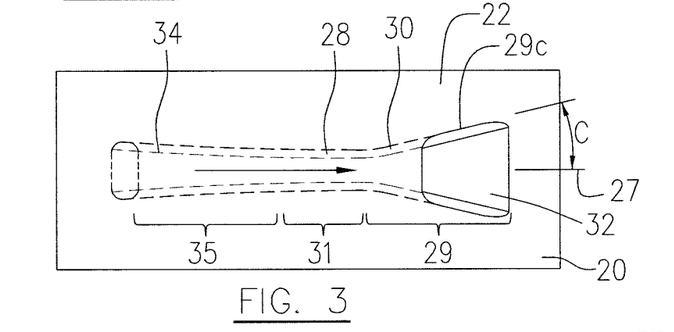
FIG. 3 is a partial top plan view of a combustor liner showing the cooling passage extending therethrough.
Figure 4:
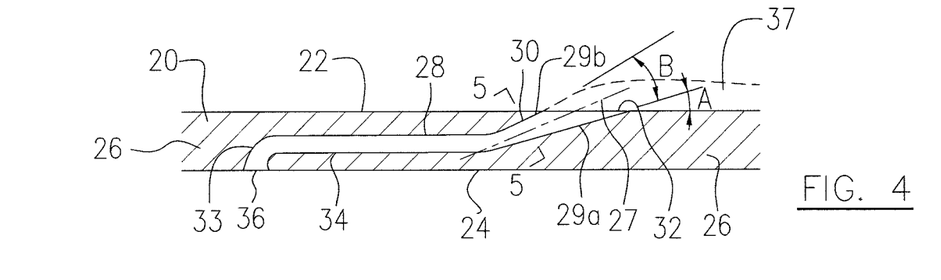
FIG. 4 is a partial cross-sectional view of the combustor liner of FIG. 3.
Figure 5:
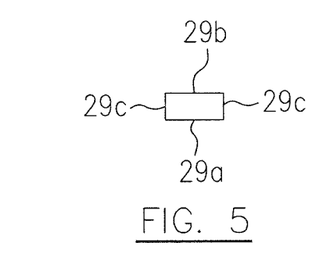
FIG. 5 is a cross-sectional view of the cooling passage taken along line 5-5 of FIG. 4.

It is necessary to cool the combustor liner 20 in order to provide durability. One possible way is to add effusion holes. FIGS. 2-4 show a cooling passage 28 as an example of an effusion hole. The cooling passage 28 extending through the body 26 of the combustor liner 20 between the hot and cold surfaces 22, 24, may include an upstream path 34 and a downstream path 30. The cooling air under a supply pressure is directed to flow through the cooling passage 28 to cool the combustor liner 20 and is then discharged into the combustor. The supply pressure of the cooling air on the cold surface is greater than the combustion gas pressure at the hot surface. The upstream path 34 may include an entry section 35 substantially parallel to the hot surface 22 or substantially parallel to both hot and cold surfaces 22, 24, and an inlet section 33 extending from the entry section 35 toward the cold surface 24 to define an inlet opening 36 on the cold surface 24. The downstream path 30 may include a metering section 31 substantially parallel to the hot surface 22 or substantially parallel to both hot and cold surfaces 22, 24, and a flared section 29 extending from the metering section 31 angling and flaring toward the hot surface 22 where the flared section 29 defines an outlet opening 32 on the hot surface 22.

The metering section 31 may be generally straight, with a substantially constant cross-sectional area to guide the cooling air flow toward the flared section 29. The cross-sectional area of the cooling passage 28 may be the smallest at the metering section 31 and is the main parameter for controlling the cooling air mass flow rate.

In accordance with this embodiment as shown in FIGS. 2-5, the flared section 29 may have a rectangular cross-section defined between opposed surfaces 29a and 29b and between opposed sides 29c. The rectangular cross-section of the flared section 29 increases as the flared section 29 extends from the metering section 31 toward the hot surface 22. The opposed sides 29c may be substantially normal to the hot surface 22. The cooling air flow enters the upstream path 34 via the inlet opening 36 on the cold surface, then passes through metering section 31, and the flared section 29 and exits through the outlet opening 32, to form a cooling film 37 along the hot surface 22 downstream of the outlet opening 32. The quality of the cooling film 37 is influenced by angle A (see FIG. 4) which is defined between the hot surface 22 and the surface 29a that faces away from the cold surface 24. The angle A may be less than 20 degrees. The flared section 29 is "flared" in order to slow down the cooling air velocity so that the cooling air flows onto the hot surface 22 of the combustor liner 20 downstream of the outlet opening 32, rather than lifting off the hot surface 22 and mixing with hot gases within the combustor liner 20. Angle B (see FIG. 4) is defined between the two opposed surfaces 29a and 29b (that face away from the hot surface 22), and angle C (see FIG. 3) is a lateral angle defined between one of the sides 29c and a flared section central axis 27. The flared section central axis 27 extends at an oblique angle AA with respect to the hot surface 22 (see FIG. 7). Therefore, the angles B and C also affect the quality of the cooling film 37 and may be selected in a range between 0 degrees and 12 degrees.

Figure 6:
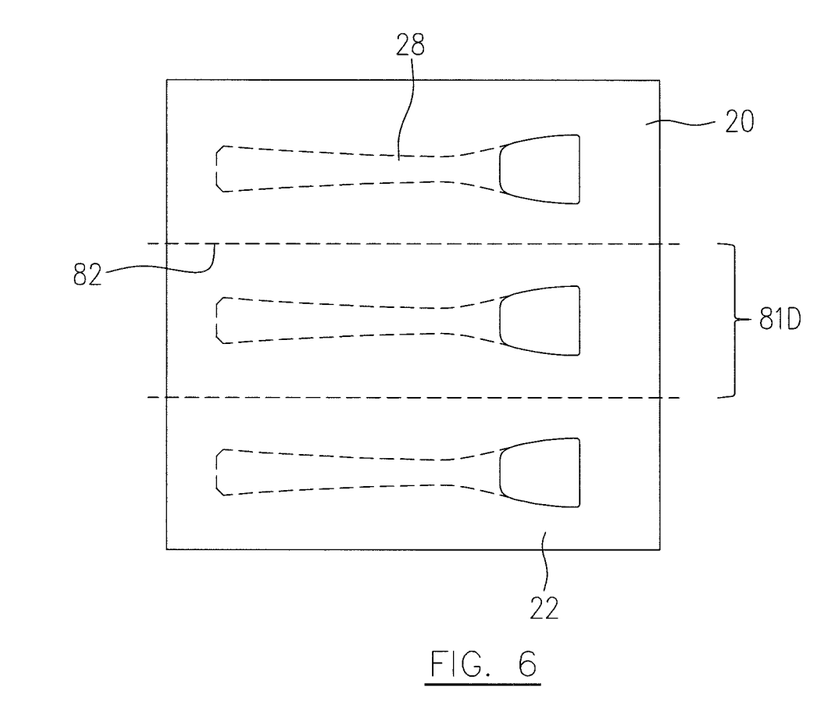
FIG. 6 is a partial top plan view of the combustor liner of FIG. 3, showing a plurality of the cooling passages.

Referring to FIG. 6, the plurality of cooling passages 28 may be arranged in an array around the entire circumference of the combustor liner 20. Three such cooling passages 28 are shown in FIG. 6, with a spacing D. The region that each cooling passage 28 must cool is indicated between broken lines 81. It can be appreciated that a location 82 approximately mid-way between the adjacent cooling passages 28 would be cooled the least. This location 82 is cooled by conduction from the nearby cooling passages 28 through the body 26 of the combustor liner 20.

The cooling of location 82 can be improved by reducing the spacing D between the cooling passages 28. However, this would necessitate more cooling passages to cover the full circumference of the combustor liner 20 and would therefore require an increase in the amount of cooling air required.

Figure 13:
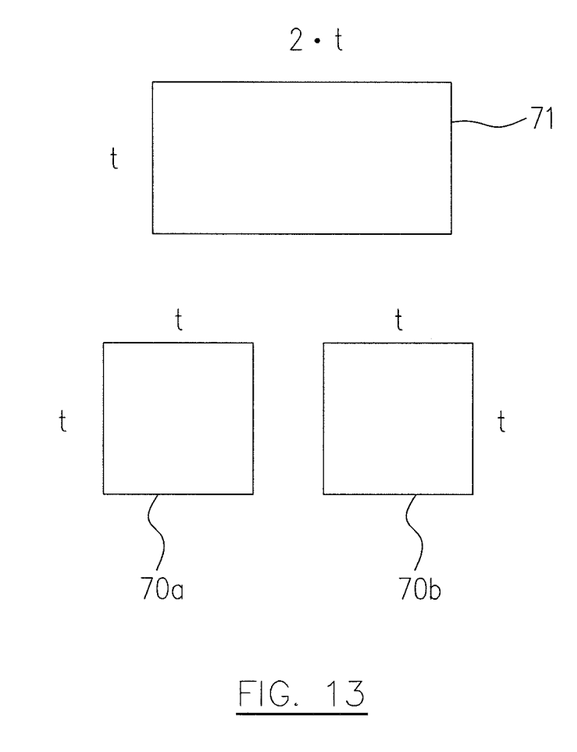
FIG. 13 is a schematic illustration of a comparison of the combined cross-section of two upstream paths and the cross-section of a metering section of a cooling passage.

Referring to FIG. 13 which is a schematic illustration for convenience of description in a comparison of the combined cross-section of two upstream paths and the cross-section of a metering section of a cooling passage, a cooling passage may have a metering section 71 with a rectangular cross-section of a thickness t, a width 2·t, an area $A=2 \cdot t^2$ and a perimeter $P=6 \cdot t$. The cooling passage may be split into two upstream paths 70a and 70b of equal size and with a cross-sectional area each of which is half of the cross-sectional area of the metering section 71. These two upstream paths 70a, 70b may feed cooling air flow to the metering section 71. The combined perimeters of 70a and 70b is $P'=8 \cdot t$ (note that $P'=8/6 \cdot P$). The combined perimeters of the upstream paths 70a and 70b is approximately 1.33 times that of the perimeter of metering section 71.

Generally, having more than one upstream path in a cooling passage increases the surface area of the upstream path. This results in improved convection cooling within the upstream paths.

Figure 7:
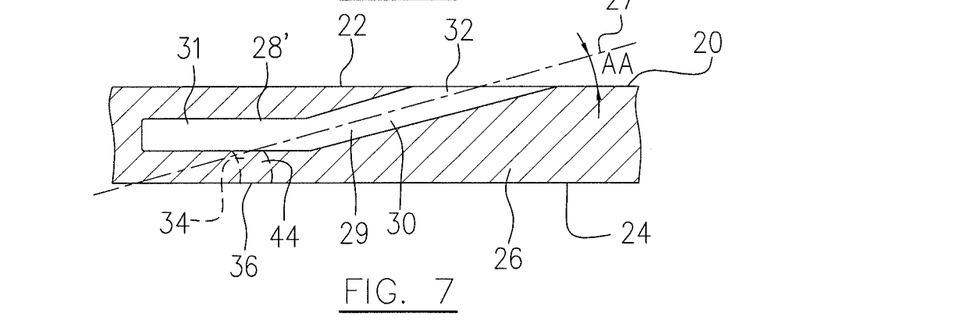
FIG. 7 is a partial cross-sectional view of a combustor liner showing a cooling passage extending therethrough according to another embodiment.
Figure 8:
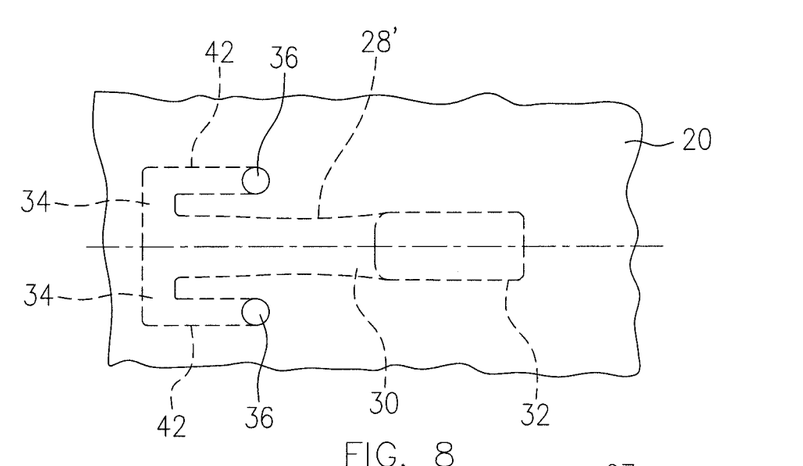
FIG. 8 is a partial bottom plan view of the combustor liner of FIG. 7, showing the cooling passage.
Figure 9:
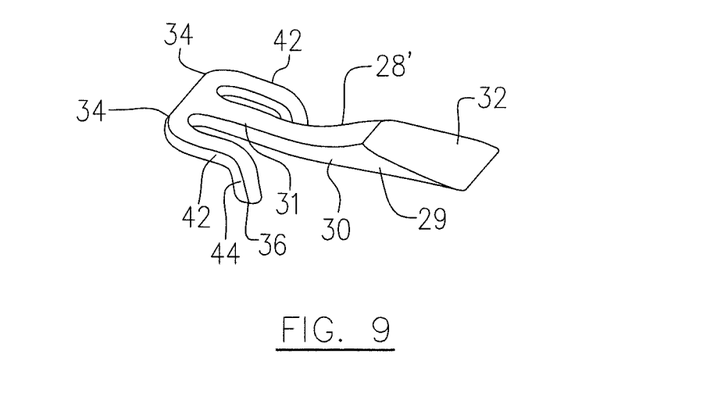
FIG. 9 is an isometric view of the cooling passage shown in FIG. 7.

In FIGS. 7-9 the combustor liner 20 may be provided with a plurality of cooling passages 28' (only one is shown) each of which extends through the body 26 of the combustor liner 20 between the hot and cold surfaces 22, 24. Each of the cooling passages 28' (at least one thereof) according to another embodiment may include a downstream path 30 which is identical to the downstream path 30 shown in FIGS. 2-4, including the metering section 31 and the flared section 29, the description of which will not be repeated hereinafter. Each of the cooling passages 28' (at least one thereof) may further include a plurality of upstream paths 34 which merge into the downstream path 30, for example into the metering section 31 of the downstream path 30.

The downstream path 30 may have a constant cross-section defined by the metering section 31, or alternatively a varying cross-section having a minimum cross-section greater than any individual cross-section of the respective upstream paths 34. The upstream paths 34 may each have a substantially constant cross-section. Alternatively, the upstream paths 34 may each have a varying cross-section of a similar or of different patterns. Optionally, the substantially constant cross-sections of the respective upstream paths 34 may be substantially equal.

Further details of the metering section 31 and the flared section 29 shown in FIGS. 7-9 have been described above with reference to FIGS. 2-4 and will not be repeated hereinafter.

Each of the cooling passages 28' (at least one thereof) according to this embodiment, may have first and second upstream paths 34 merging into the downstream path 30. The first and second upstream paths 34 may each include a branch section 42 substantially parallel to the metering section 31 (see FIG. 8) of the downstream path 30, and thus parallel to the hot surface 22 or to both hot and cold surfaces 22, 24. The metering section 31 of the downstream path 30 may therefore be flanked by the branch section 42 of the first upstream path 34 and the branch section 42 of the second upstream path 34.

Each of the upstream paths 34 may include an inlet section 44 extending from the branch section 42 toward the cold surface 24 to define the respective inlet opening 36 on the cold surface 24.

Figure 14:
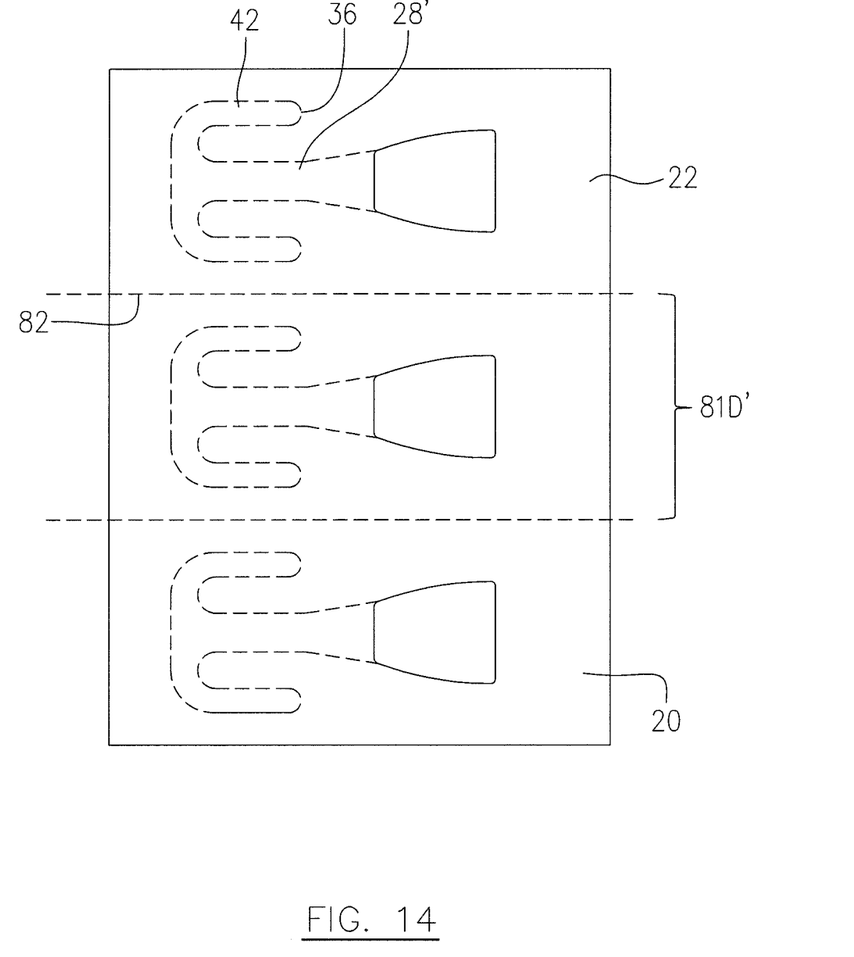
FIG. 14 is a top plan view of the combustor liner of FIG. 7, showing a plurality of cooling passages.

Similar to the embodiment of FIG. 6, the cooling passages 28' illustrated in FIGS. 7-9 may be arranged in an array around the entire circumference of the combustor liner 20. Three such cooling passages 28' are shown in FIG. 14 with a spacing D'. The region that each cooling passage 28' must cool is between broken lines 81. Two inlet openings 36 and two branch sections 42 make it possible to increase the passage spacing D' while still adequately cooling the location 82.

Figure 10:
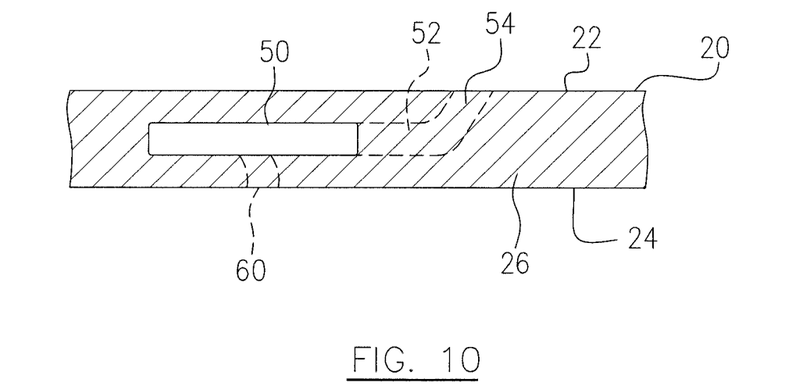
FIG. 10 is a partial cross-sectional view of a combustor liner, showing a cooling passage extending therethrough according to another embodiment.
Figure 11:
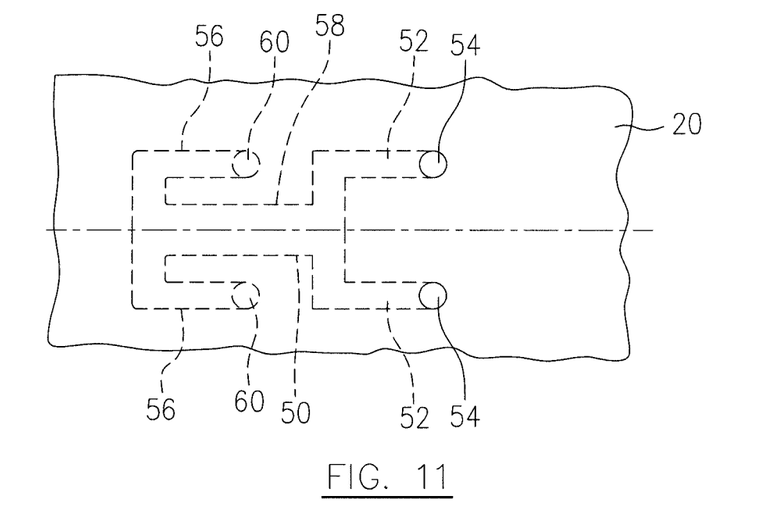
FIG. 11 is a partial top plan view of the combustor of liner of FIG. 10, showing the cooling passage.

In FIGS. 10 and 11 a cooling passage 50 according to another embodiment extends through the body 26 of the combustor liner 20 between the hot and cold surfaces 22, 24. It is also understood that the combustor liner 20 defines a plurality of the cooling passages 50 but only one is shown and described. The respective cooling passages 50 may each include a plurality of upstream paths such as first and second upstream paths 56 defining respective inlet openings 60 on a cold surface such as the surface 24 (which is exposed to cooling air), and extending from the respective inlet openings 60 inwardly into the body 26 of the combustor liner 20. The respective cooling passages 50 may also include a plurality of downstream paths such as first and second downstream paths 52 connected to and in fluid communication with the upstream paths 56, for example via a metering path 58. The first and second downstream paths 52 may extend toward the hot surface, for example the surface 22 (which is exposed to the hot gases generated in the combustor) to define respective outlet openings 54 on the hot surface 22. All the upstream and downstream paths 56, 52 in each of the cooling passages 50 are connected together and all are in fluid communication through the respective cooling passage 50.

The upstream paths 56 may be configured similar to the configuration of the first and second upstream paths 34 of the embodiment shown in FIGS. 7-9. The first and second downstream paths 52 may be configured similar to the configuration of the first and second upstream paths 56, but may extend toward the hot surface 22 of the combustor liner 20, instead of extending toward the surface 24.

Figure 12:
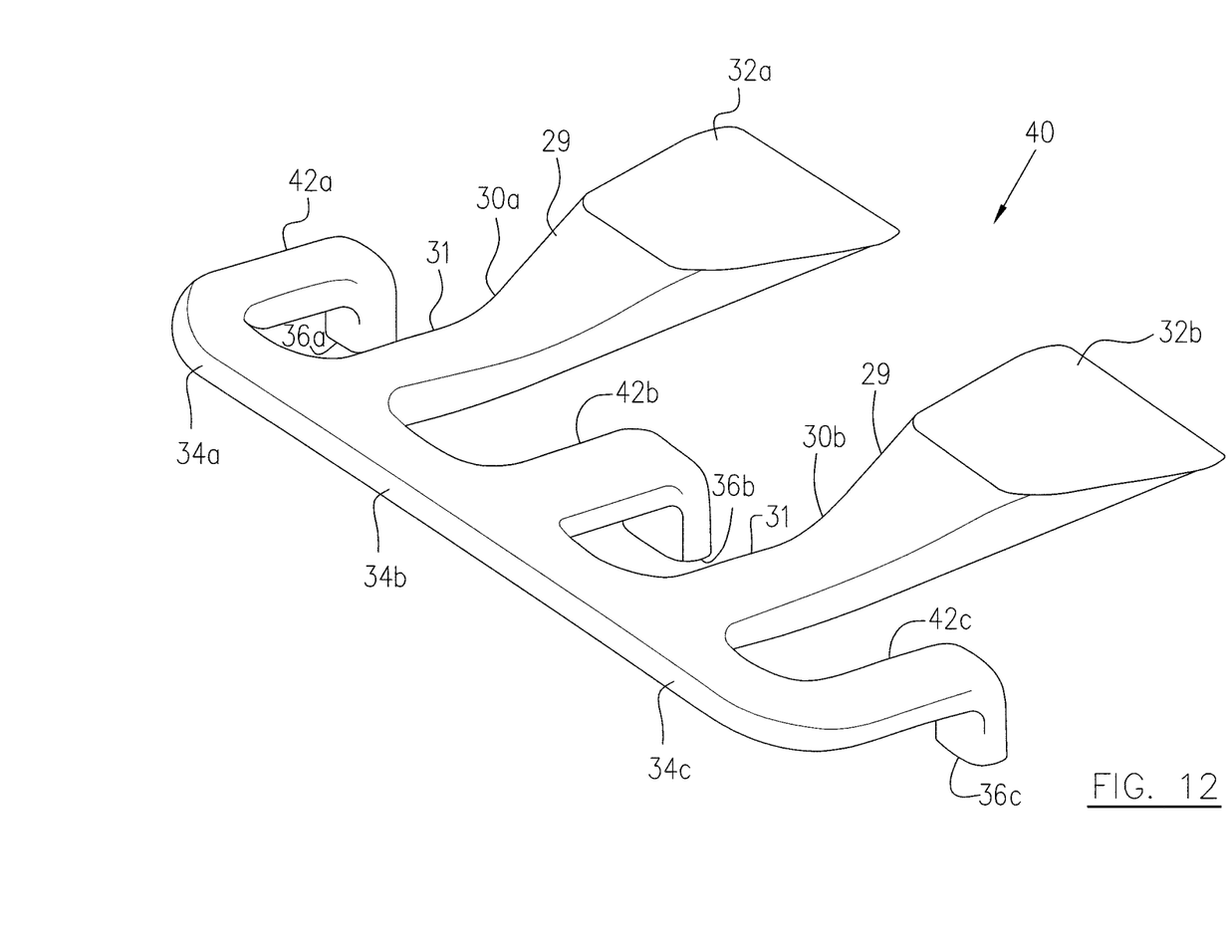
FIG. 12 is an isometric view of a cooling passage according to a further embodiment.

Referring to FIG. 12, alternative to the embodiment shown in FIGS. 7-9, each of the cooling passages 40 according to a further embodiment may include first and second downstream paths 30a and 30b, optionally substantially parallel each other, each having a metering section 31 and a flared section 29 and defining respective first and second outlet openings 32a, 32b. The first and second downstream paths 30a and 30b are similar to the downstream path 30 of each of the cooling passages 28' of FIGS. 7-9 and similar features such as the metering section 31 and flared section 24 will not be redundantly described in detail hereinafter. Each of the cooling passages 40 may further include a plurality of upstream paths 34a, 34b and 34c which are similar to the upstream path 34 of each of the cooling passages 28', and may each have a branch section 42a, 42b or 42c substantially parallel to a respective metering section 31 of the downstream paths 30a and 30b. Each of the upstream paths 34a, 34b and 34c may define respective inlet openings 36a, 36b and 36c. The upstream paths 34a and 34c may be connected directly to the respective downstream paths 30a and 30b while the upstream path 34b may be connected directly to both downstream paths 30a and 30b. All downstream paths 30a, 30b and all upstream paths 34a, 34b and 34c of each of the cooling passages 40 may be connected together in fluid communication.

Similar to the cooling passage 28' of FIGS. 7-9, the outlet openings 32a and 32b of cooling passage 40 may be defined on the hot surface of the combustor liner and the inlet openings 36a, 36b and 36c of cooling passage 40 may be defined on the cold surface of the combustor liner.

Optionally, the sum of the inlet opening areas (the combined cross-section of inlet openings 36a, 36b and 36c) may be equal to the sum of the metering sections 31 (the combined cross-section of the metering sections of the respective downstream paths 30a and 30b). The sum of the flow areas at the outlet openings 32a and 32b may be larger than the sum of two metering sections 31 in order to provide film cooling of the combustion liner 20.

During take-off, particles of dirt may be present in the ambient air surrounding the aircraft, which can enter the engine, particularly in the vicinity of the combustor cold surface 24. Therefore, a lower limit to the size of the inlet openings 36 and the upstream paths 34 may desirable to prevent the inlet openings 34 from becoming obstructed by a build-up of dirt particles up to say 0.020" in diameter. It may be applicable for the inlet openings 36 and the upstream paths 34 to be larger than this to avoid plugging with dirt.

It is also noted that a cooling passage with more than one inlet opening would be fault tolerant. If one of the more than one inlet openings was to become plugged with dirt, the other inlet openings could still supply cooling air flow to one or more metering sections and the flared sections.

A conventional effusion cooling hole is usually a straight cylindrical passage the length of which is dictated by the thickness of the combustor liner and the angle of the hole with respect to the combustor liner surfaces. Some of the described embodiments of the cooling passages enhance in-hole heat convection by increasing the cooling passage length and shaping it to cover more surface area per hole network than a traditional effusion hole configuration, resulting in increased cooling efficiency of a single skin combustor liner. The improved cooling efficiency will result in reduced cooling air consumption which will in turn have a positive effect on engine efficiency. The application of such embodiments onto a single skin liner may also result in weight savings when compared to other low-cooling-air-consumption systems such as double or multi-walled combustors.

In addition to improving cooling efficiency, some described embodiments of the cooling passages may make the overall system less dependent on the film cooling mechanism. This is desirable in regions where the film tends to mix with the hot gas because the cooling system having such cooling passages is enabled to maintain efficient functioning in a larger range of flow conditions.

The above description is meant to be exemplary only, and one skilled in the art will recognize that changes may be made to the embodiments described without departing from the scope of the described subject matter. For example, a turbofan gas turbine engine has been taken as an example to illustrate application of the described subject matter. Nevertheless, the described subject matter may also be applicable to gas turbine engines of other types. The above-described embodiments relate to a combustor liner, however the cooling passages according to the described embodiments, may also be applicable to other turbine components, such as heat shields, turbine shrouds, etc. The described embodiments illustrate but do not limit the configurations of cooling passages. Various alternative configurations are applicable but cannot be exhaustively described herein. Still other modifications which fall within the scope of the described subject matter will be apparent to those skilled in the art, in light of a review of this disclosure, and such modifications are intended to fall within the appended claims.

The invention claimed is:

1. A liner of an aircraft engine combustor, comprising:
a body between a hot surface for being exposed to hot combustion gases and a cold surface for being exposed to cooling air, the hot and cold surfaces being opposite each other, the hot surface facing toward an interior of the aircraft engine combustor, the cold surface facing toward an exterior of the aircraft engine combustor; and
a plurality of cooling passages extending through the body of the liner between the hot and cold surfaces, at least one of the cooling passages comprising:
a plurality of upstream paths defining a plurality of inlet openings on the cold surface and merging into a downstream path that defines an outlet opening on the hot surface, the outlet opening having a cross-sectional area at the hot surface larger than a cross-sectional area of each one of the plurality of inlet openings at the cold surface, and a metering section having a constant cross-section over a distance along the hot surface, the constant cross-section transverse to the hot surface, the metering section extending parallel to the hot surface and disposed between the plurality of upstream paths and the downstream path, the constant cross-section smaller than each one of the plurality of inlet openings at the cold surface and the outlet opening at the hot surface.

2. The liner as defined in claim 1 wherein a flared section defines said outlet opening.

3. The liner as defined in claim 1 wherein the constant cross-section of the metering section is smaller than a combined cross-section of the upstream paths.

4. The liner as defined in claim 1 wherein the constant cross-section of the metering section is greater than any individual cross section of the respective upstream paths.

5. The liner as defined in claim 1 wherein each upstream path of the plurality of upstream paths comprises a constant cross section.

6. The liner as defined in claim 1 wherein at least a portion of the respective upstream paths is parallel to the hot surface of the liner.

7. The liner as defined in claim 1 wherein the downstream path comprises a flared section having a rectangular cross-section defined between opposed surfaces and between opposed sides, the opposed sides being normal to the hot surface and one of the opposed surfaces that faces away from the cold surface defining an angle with respect to the hot surface, the angle being less than 20 degrees.

8. The liner as defined in claim 7 wherein the flared section defines a flared section central axis extending at an oblique angle with respect to the hot surface, the opposed sides of the flared section each defining an angle with respect to the central axis less than 12 degrees.

9. The liner as defined in claim 7 wherein the opposed surfaces of the flared section define therebetween an angle less than 12 degrees.

10. A combustor of an aircraft engine, comprising:
a combustor liner having a hot surface for being exposed to hot combustion gases within the combustor and a cold surface for being exposed to cooling air, the hot and cold surfaces being opposite each other, the cold surface facing toward an exterior of the combustor and the hot surface facing toward an interior of the combustor; and
a plurality of cooling passages extending through the combustor liner from the cold surface to the hot surface, at least one of the cooling passages comprising a plurality of upstream paths defining respective inlet openings on the cold surface and merging into a number of downstream paths defining respective outlet openings on the hot surface, each one of the outlet openings having a cross-sectional area at the hot surface larger than a cross-sectional area of each one of the inlet openings at the cold surface, the at least one of the cooling passages including a metering section having a constant cross-section over a distance along the hot surface, the constant cross-section transverse to the hot surface, the metering section extending parallel to the hot surface and disposed between the plurality of upstream paths and the number of downstream paths.

11. The combustor as defined in claim 10 wherein the number of downstream paths is fewer than the number of upstream paths.

12. The combustor as defined in claim 10 wherein the number of downstream paths is equal to the number of upstream paths.

13. The combustor as defined in claim 10 wherein a flared section defines one of said outlet openings.

14. The combustor as defined in claim 10 wherein at least one of the plurality of upstream paths comprises a section thereof parallel to the hot surface and an inlet section defining one of said inlet openings, the one of said inlet openings being in fluid communication with the parallel section of the at least one of the plurality of upstream paths and the parallel section merging with the metering section.

15. The combustor as defined in claim 10 wherein at least one of the plurality of upstream paths comprises a section thereof parallel to the metering section.

16. An aircraft engine, comprising:
a compressor for pressurizing air;
a combustor in serial flow communication with the compressor downstream thereof, the combustor having a combustor liner including a hot surface for being exposed to hot combustion gases within the combustor and a cold surface for being exposed to cooling air, the hot and cold surfaces being opposite each other, the cold surface facing toward an exterior of the combustor and the hot surface facing toward an interior of the combustor,
a plurality of cooling passages extending through the combustor liner between the hot and cold surfaces, each of the cooling passages comprising:
a plurality of upstream paths defining respective inlet openings on the cold surface and extending from the respective inlet openings inwardly into the combustor liner toward the interior of the combustor,
a plurality of downstream paths connected with the upstream paths and extending toward the hot surface to define respective outlet openings on the hot surface, all of the upstream and downstream paths being connected together, a flared section defining one of said outlet openings, each one of the outlet openings having a cross-sectional area at the hot surface larger than a cross-sectional area of each one of the inlet openings at the cold surface, and a metering section having a constant cross-section over a distance along the hot surface, the constant cross-section transverse to the hot surface and disposed between the plurality of upstream paths and the plurality of downstream paths, the respective metering sections of the plurality of cooling passages extending in a common plane parallel to the hot surface; and a turbine section for extracting energy from the combustion gases, the turbine section in serial flow communication with the combustor downstream thereof.

17. The aircraft engine as defined in claim 16 wherein the plurality of upstream paths comprise first, second and third upstream paths connected together and connected to the plurality of downstream paths via the metering sections.

18. The aircraft engine as defined in claim 16 wherein the plurality of downstream paths comprise first and second downstream paths connected to the plurality of upstream paths via the metering sections.

19. The aircraft engine as defined in claim 16 wherein the plurality of upstream paths comprise a respective section parallel to a respective metering section, and in the common plane.

20. The combustor as defined in claim 10, wherein the combustor liner is a single skin combustor liner, the cold surface forming an outer periphery of the combustor.

* * * * *